(12) United States Patent
Carlsgaard et al.

(10) Patent No.: US 6,894,726 B2
(45) Date of Patent: May 17, 2005

(54) HIGH-DEFINITION DE-INTERLACING AND FRAME DOUBLING CIRCUIT AND METHOD

(75) Inventors: Eric Stephen Carlsgaard, Zionsville, IN (US); David Leon Simpson, Fishers, IN (US); Michael Evan Crabb, Carmel, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 66 days.

(21) Appl. No.: 10/190,282

(22) Filed: Jul. 5, 2002

(65) Prior Publication Data

US 2004/0004672 A1 Jan. 8, 2004

(51) Int. Cl.[7] .............................. H04N 7/01; H04N 11/20
(52) U.S. Cl. ...................... 348/448; 348/441; 348/452; 348/911
(58) Field of Search ................................ 348/448, 441, 348/451, 452, 458, 459, 456, 416.1, 715, 426.1, 911, 97; 386/131; 345/600, 603, 604

(56) References Cited

U.S. PATENT DOCUMENTS

| | | | | |
|---|---|---|---|---|
| 4,750,057 A | | 6/1988 | Baumeister | 360/35.1 |
| 5,257,103 A | | 10/1993 | Vogeley et al. | 358/140 |
| 5,610,661 A | * | 3/1997 | Bhatt | 348/446 |
| 6,147,712 A | * | 11/2000 | Shimamoto et al. | 348/446 |
| 6,166,772 A | | 12/2000 | Voltz et al. | 348/448 |
| 6,222,589 B1 | * | 4/2001 | Faroudja et al. | 348/448 |
| 6,243,140 B1 | * | 6/2001 | Suzuki | 348/448 |
| 6,297,848 B1 | * | 10/2001 | Westerman | 348/448 |
| 6,380,978 B1 | * | 4/2002 | Adams et al. | 348/452 |
| 6,392,712 B1 | * | 5/2002 | Gryskiewicz et al. | 348/584 |
| 6,456,329 B1 | * | 9/2002 | Tinker et al. | 348/448 |
| 6,549,240 B1 | * | 4/2003 | Reitmeier | 348/459 |
| 6,597,402 B1 | * | 7/2003 | Butler et al. | 348/447 |

FOREIGN PATENT DOCUMENTS

| | | | | |
|---|---|---|---|---|
| JP | HEI.4. 322383 | 11/1992 | | G06F/15/64 |
| JP | P2000-224551 A | 8/2000 | | H04N/15/64 |
| WO | WO 97/17804 | 5/1997 | | H04N/5/44 |
| WO | WO 01/15442 A1 | 3/2001 | | H04N/7/01 |

* cited by examiner

*Primary Examiner*—John Miller
*Assistant Examiner*—Jean W. Désir
(74) *Attorney, Agent, or Firm*—Joseph S. Tripoli; Harvey D. Fried; Robert B. Levy (57) ABSTRACT

A combined de-interlacing and frame doubling system (114, 114' and 114") advantageously serves to de-interlace successive lines of Present Field Video data at twice the field rate to yield an output bit stream suitable for display on display device that utilizes progressive scanning. The de-interlacing and frame doubling system in accordance with present principles includes a frame memory mechanism (116, 116' and 116") for storing at least one frame of interlaced video having a prescribed field rate. At least one de-interlacing circuit (1140$_1$, 1140'$_1$, 1140") pulls at least two fields of video data from the memory mechanism at a rate of at least twice the field rate for performing a full de-interlacing function in half of a field period to generate the a progressive, frame doubled signal for receipt at the display device.

10 Claims, 6 Drawing Sheets

HIGH-DEFINITION DE-INTERLACING AND FRAME DOUBLING CIRCUIT AND METHOD

TECHNICAL FIELD

This invention relates to a method and apparatus for converting a high-definition video signal from an interfaced format to a progressive format.

BACKGROUND ART

Conventional television images have an interlaced format. Each image frame typically comprises two fields, each scanned by a predetermined number of horizontal lines. During each field period, only half the horizontal lines in each field are scanned. Typically, the odd number lines are scanned in the first field while the even number lines are scanned in the second field. The two fields comprising each frame are displayed in sequence so that the scanning appears interlaced, allowing the viewer to perceive the full image. Television images that conform to the standard established by the National Television Standards Committee (NTSC) have 262.5 scan lines in each field, thus giving rise to 525 scan lines per frame, with 30 frames (60 fields) per second. The Phase Alternating Line (PAL) standard adopted by some European countries employs 625 lines per frame, with 25 frames (50 fields) per second.

The emergence of high definition television, and more particularly, the High Definition terrestrial broadcast system proposed by the Grand Alliance and described in the 1994 Proceedings of the National Association of Broadcasters, 48th Annual Broadcast Engineering Conference Proceedings, Mar. 20–24, 1994, has led to the development of digital display devices. One such digital display device employs Liquid Crystal on Silicon (LCOS) technology, which utilizes a progressive display format as opposed to the interlaced scanning format used by conventional television receivers. For this reason, incoming television signals having interlaced scanning must undergo de-interlacing before display on a display device that uses a progressive display format. For LCOS technology display devices, the field rate of incoming signals must be changed from the standard rate (i.e., 60 Hz in the United States) to a rate of twice the standard rate in order (i.e., the display signal must under go frame doubling) to drive the LCOS display device with the required sequential reversing frames.

Present-day systems for performing de-interlacing and frame doubling have employed one circuit for de-interlacing and one for frame doubling, usually implemented with two circuits in parallel, with the de-interlacing and frame doubling circuits having separate memories. The use of separate circuits for de-interlacing and frame doubling increases the need for memory circuits.

Thus, there is need for a de-interlacing and frame doubling circuit that reduces the amount of needed memory.

BRIEF SUMMARY OF THE INVENTION

Briefly, in accordance with present principles, a combined de-interlacing and frame doubling system includes a frame memory for storing at least one frame of interlaced video having a prescribed field rate. At least one de-interlacing circuit pulls at least two fields of video data from the memory at a rate of at least twice the field rate for performing a full de-interlacing function in half of a frame period to generate a progressive, frame doubled signal for receipt at a display device.

In one embodiment, the de-interlacing circuit performs two de-interlacing calculations in parallel by pulling video information (including video data and motion) from two sequential lines of the frame memory. As each of the de-interlacing circuits generates new video data, the data is stored in a line memory, used by the other de-interlacing circuit of the pair. Thus, the two de-interlacing circuits each alternately write to, and read from a common line memory in a "ping-pong" fashion.

In a second embodiment, a single de-interlacing circuit can perform the de-interlacing and frame doubling task by only writing newly calculated, but not existing lines of video information, into the frame memory. The existing lines and newly calculated lines are retrieved from the memory twice, with alternating lines read from different areas of the memory.

DETAILED DESCRIPTION

Figure 1:
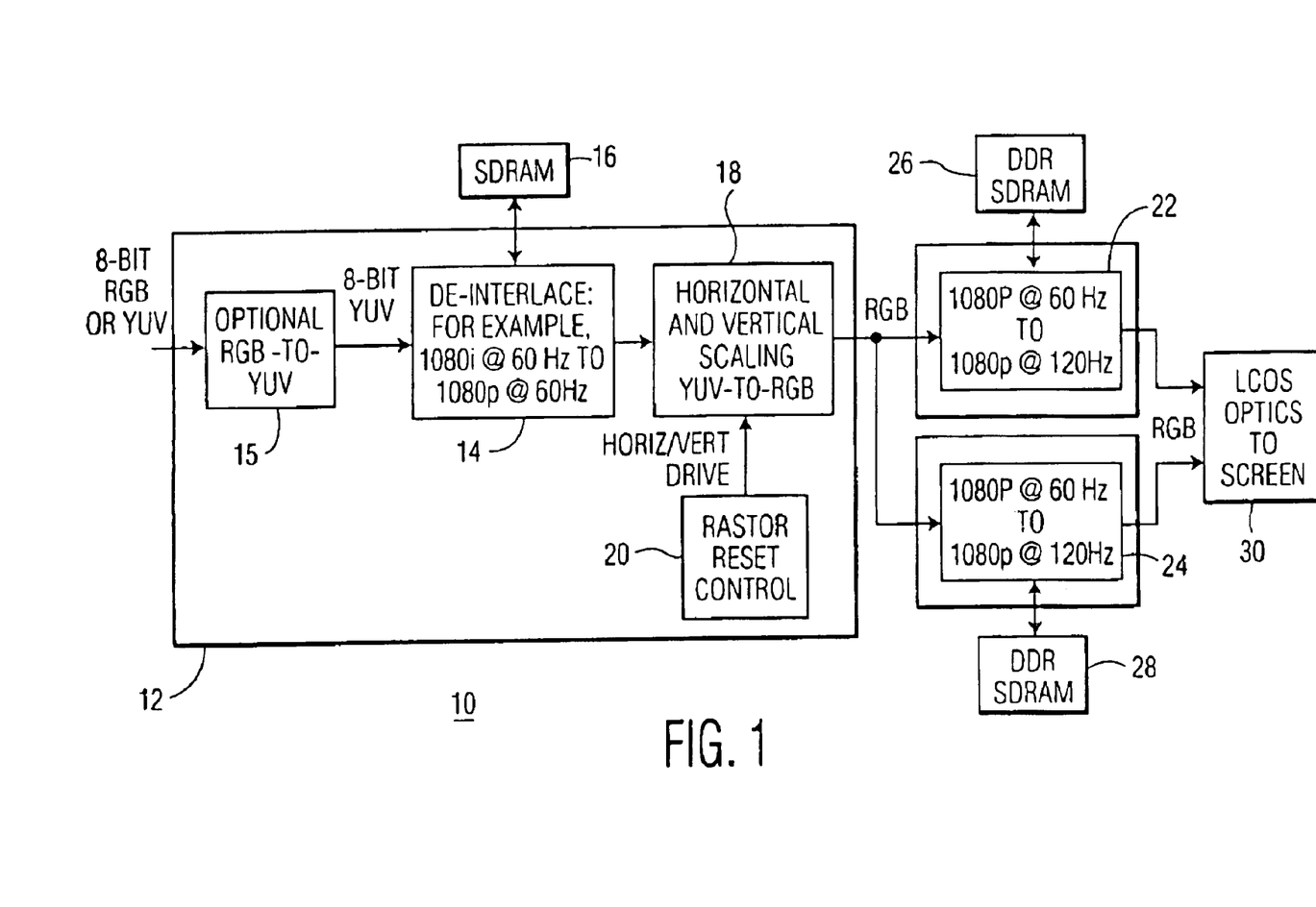
FIG. 1 depicts a block schematic of a de-interlacing and frame doubling system in accordance with the prior art.

FIG. 1 depicts a de-interlacing and frame doubling system 10 in accordance with the prior art. The system 10 includes a de-interlacing block 12 that includes a de-interlacing circuit 14 that performs a de-interlacing operation on an incoming 8-bit YUV-coded video signal. (To the extent that the incoming signal is coded RGB, an optional converter 15 performs the requisite RGB-to YUV conversion.) The de-interlacing circuit 14 has an associated memory 16, typically one or more Synchronous Dynamic Random Access Memory (SDRAM) ICs into which data is written, and from which data is read by the de-interlacing circuit 14 in the course of performing a de-interlacing operation. In practice, the de-interlacer 14 circuit can convert 540-lines of interlaced video data at a field rate of 60 Hz to yield 1080-lines of progressive video at 60 Hz. Within the block 12, a circuit 18 performs horizontal and vertical scaling on the de-interlaced signal produced by the de-interlacing circuit 14, as well as converting the de-interlaced output signal from YUV coding to RGB coding. The scaling circuit 18 receives horizontal and vertical drive signals from a raster reset control circuit 20.

The resultant output signal of the block 20 has a vertical sync rate (frequency) the same as that of the incoming signal. Certain types of high definition displays, such as a Liquid Crystal on Silicon display device 30, require an incoming video signal at a frame rate (e.g., 120 Hz.) that is twice the standard progressive frame rate (e.g., 60 Hz.) to create the required sequential reversing frames. To that end, the de-interlacing and frame doubling system 10 of the prior art includes a pair of frame doubling circuits 22 and 24, each coupled to one of two corresponding DDR SDRAMs 26 and 28, respectively. The frame doubling circuit 22 stores the incoming frame while the other frame doubling circuit 24 performs a frame doubling operation on the previous frame. Collectively, the circuits 22 and 24 yield progressive video at twice the normal frame rate for input to the display device 30.

The prior art de-interlacing and frame doubling system 10 suffers from the disadvantage that de-interlacer circuit 14 and each of the frame doubler circuits 22 and 24 require separate memories (i.e., memories 16, 26, and 28, respectively) for operation, thus increasing cost and complexity.

Figure 2:
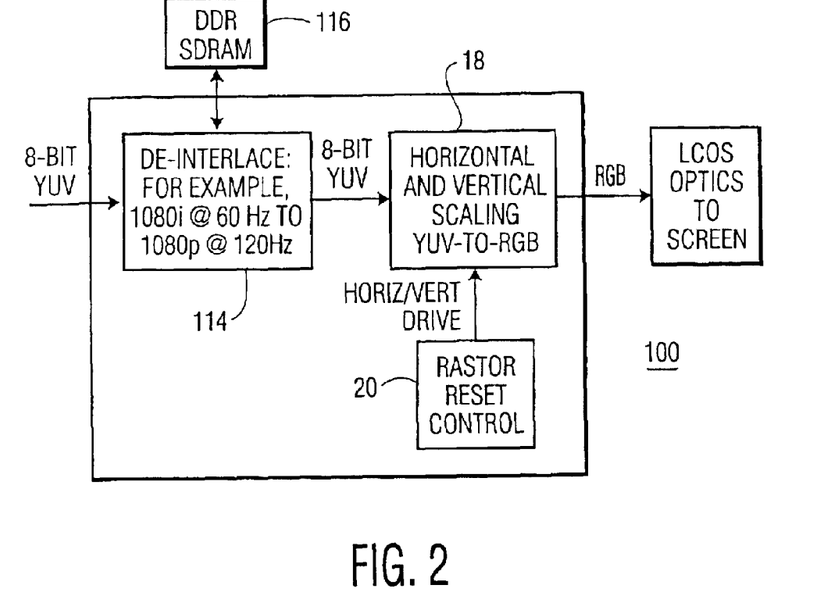
FIG. 2 depicts a block schematic diagram of a de-interlacing and frame doubling system according to present principles.

FIG. 2 depicts a block schematic diagram of a combined de-interlacing and frame doubling block 100 in accordance with present principles. The block 100 includes a de-interlacing mechanism 114 for de-interlacing an incoming 8 bit YUV coded video. The de-interlacing mechanism 114 has an associated frame memory system 116 that includes at least one DDR SDRAM into which data is written, and from which data is read in the course of de-interlacing the incoming video signal to yield a progressive signal at twice the frame rate of the incoming signal, thereby accomplishing frame doubling. Thus, upon receipt of a 1080-line interlaced signal having a field rate of 60 Hz, the de-interlacing mechanism 114 according to the present principles will output a frame doubled 1080-line progressive video signal having a frame rate of 120 Hz.

Like the de-interlacing block 12 of FIG. 1, the de-interlacing and frame doubling block 100 of FIG. 2 includes a scaling circuit 18. The circuit 18 horizontally and vertically scales the output signal produced by the de-interlacing mechanism 114, and converts the de-interlaced output signal from YUV coding to RGB coding. The scaling circuit 18 receives horizontal and vertical drive signals from a Raster control circuit 20.

The de-interlacing mechanism 114 of FIG. 1 can take several different forms for performing both de-interlacing and frame doubling in a single operation. For example, the de-interlacing mechanism 114 could take the form of a conventional de-interlacing circuit, such as circuit 14 of FIG. 1 clocked by a clock circuit (not shown) having a clock frequency of 150 MHz, typically twice the conventional clock rate of ≈75 MHz employed in the prior art de-interlacing circuit 14 of FIG. 1. This approach, while feasible, presents practical difficulties in realizing such high clock speeds with current integrated circuit fabrication techniques. Alternatively, two conventional de-interlacing circuits could run at a conventional clock speed, with each circuit receiving alternate pixels. This approach limits the ability to perform spatial averaging to the vertical mode only, thereby eliminating the ability to accomplish diagonal spatial averaging.

Figure 3:
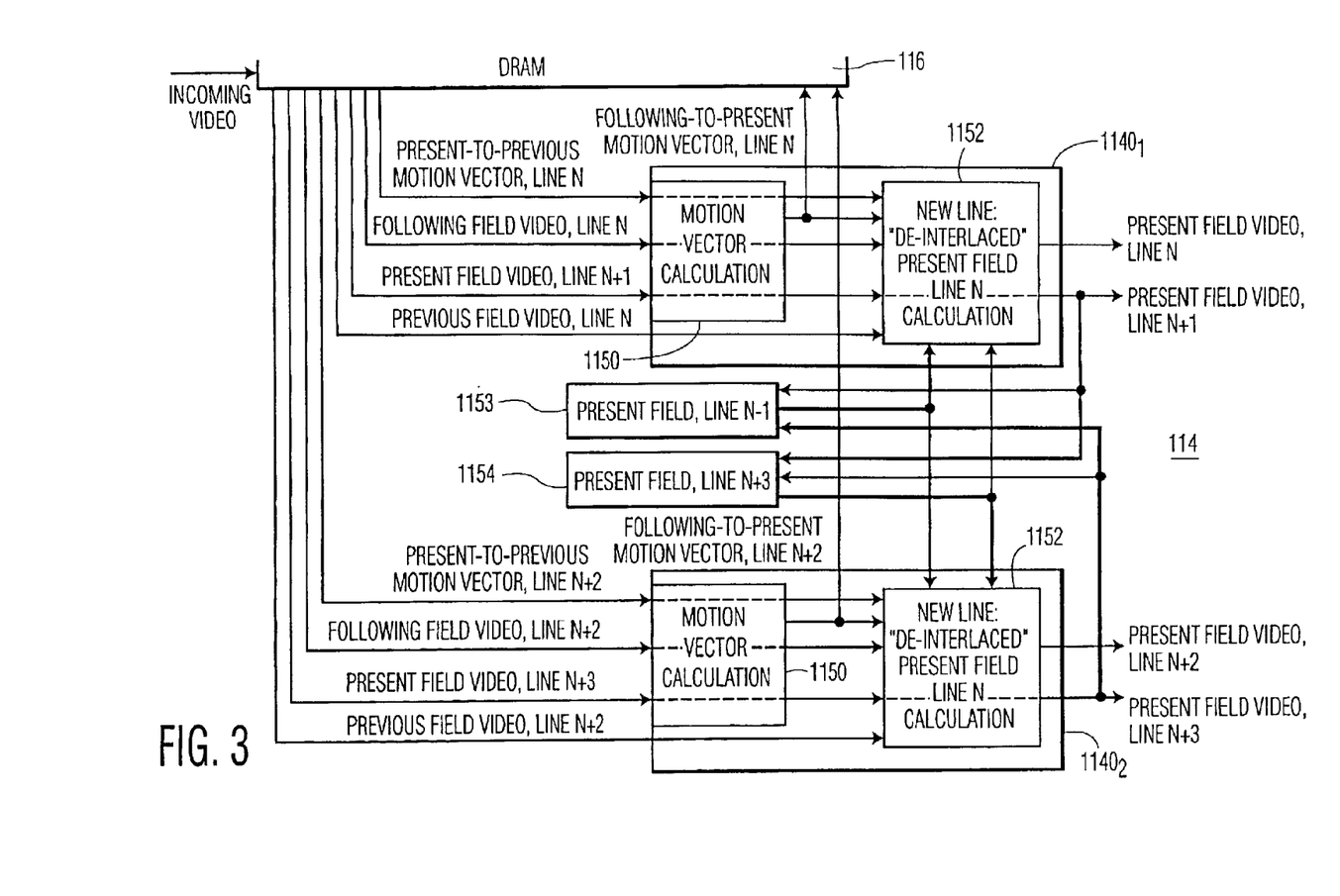
FIG. 3 depicts a first embodiment of a de-interlacer and frame doubler comprising part of the system of FIG. 2.

FIG. 3 depicts a first embodiment of the de-interlacing mechanism 114 according to present principles which advantageously accomplishes both de-interlacing and frame doubling at a conventional clock speed by performing two de-interlacing operations in parallel. As seen in FIG. 3, the de-interlacing mechanism 114 includes a pair of de-interlacing circuits $1140_1$ and $1140_2$ that each read pixels (i.e., video data and motion) at the same time from sequential lines of video information stored in the frame memory 116. The de-interlacing circuits $1140_1$ and $1140_2$ typically both have the same structure Within the de-interlacing circuit $1140_1$, a Motion Calculator 1150 receives from the memory 116 the "Present-to-Previous" motion associated with a particular Line of video (N), where N is an non-zero integer index value that successively increases by unity for each successive de-interlacing operation.

In addition to receiving the Present-to-Previous motion for Line N, the Motion Calculator 1150 in the de-interlacing circuit $1140_1$ also receives the Following Field Video Line for Line N and a Present Field Video Line for Line N+1 from the frame memory 116. The video information stored in the frame memory 116 for a given frame includes the even field lines for a previous field as well as a following field, and odd field video lines for the previous and following fields. Thus, in connection with performing a de-interlacing operation for each successive Line N, the Motion Calculator 1150 reads from the memory 116 the Following Field Video Line for Line N and the Present Field Video Line for Line N+1. From such input information, the Motion Calculator 1150 determines the Following-to-Present motion for Line N that is read to the frame memory 116. The Following-to-Present motion for Line N becomes the Present-to-Previous motion upon the next successive access of the frame memory 116 by the Motion Calculator 1150.

The Following-to-Present Motion for Line N calculated by the Motion Calculator 1150, along with the Following Field Video Line N, the Present Field Video Line N+1, and the Previous Field Video Line N from the memory system 116 all pass to a calculation block 1152. The calculation block 1152 in the de-interlacing circuit $1140_1$ also reads from each of a pair of line memories 1153 and 1154 values for the Present Field Video Line N−1 and Present Field Video Line N+3, respectively. In accordance with such input data, the calculation block 1152 produces de-interlaced (progressive) values for the Present Field video Lines N and N+1. The value for the de-interlaced Present Field Video Line N+1 is written into the line memories 1153 and 1154.

The de-interlacing circuit $1140_2$ has the same structure as the de-interlacing circuit $1140_1$ and serves to perform a de-interlacing operation on the next two video Lines N+1 and N+2 in the memory system 116 in parallel with the de-interlacing operation performed by the de-interlacing circuit $1140_1$ on the video Lines N and N+1. To that end, the de-interlacing circuit $1140_2$ includes a Motion Calculator 1150 that receives from the frame memory 116 the Present Video Field Video Line N+3, the Following Field Video Line N+2 and the Present-to-Previous Motion associated with the Line N+2. From such data, the Motion Calculator 1150 in the de-interlacing circuit $1140_2$ calculates the Following-to-Present motion for Line N+2 for input into the frame memory 116. The Following-to-Present motion for Line N+2 becomes the Present-to Previous motion for video Line N+2 upon the subsequent reading of the memory 116 to obtain the motion for that line.

Like the de-interlacing circuit $1140_1$, the de-interlacing circuit $1140_2$ includes a calculation block 1152 for generating a pair of sequential de-interlaced field video Lines N+2 and N+3. In the case of the de-interlacing circuit $1140_2$, the calculation block 1150 reads the frame memory 116 and obtains the Present Video Field video Line N+3, the Following Field Video Line N+2, and the Previous Field Video Line N+2. From the Motion Calculator 1150, the calculation block 1152 in the de-interlacing circuit $1140_1$ obtains the Following-to-Present motion for Line N+2. From the line memories 1153 and 1154, the calculation block 1152 obtains values for the Present Field Video Line N−1 and Present Field Video Line N+3, respectively. In accordance with such input values, the calculation block 1152 in the de-interlacing circuit $1140_2$ generates de-interlaced (progressive) Present Field Video Lines N+2 and N+3 in parallel with the Present Field Video Lines N and N+1 produced by the de-interlacing circuit $1140_1$.

The calculation block 1152 of the de-interlacing circuit 1140$_1$ writes the value it calculated for the Present Field Video Line N+1 into the line memory 1154 for subsequent reading by the calculation block 1152 of the de-interlacing circuit 1140$_2$ during the de-interlacing operation performed by the calculation block to generate the Present Field Video Lines N+2 and N+3. By the same token, the calculation block 1152 of the de-interlacing circuit 1140$_2$ writes the value it calculated for the Present Field Video Line N+3 into the line memory 1153 for subsequent reading by the calculation block 1152 of the de-interlacing circuit 1140$_1$ during the de-interlacing operation performed to generate the Present Field Video Lines N and N1. Thus, each of the de-interlacing circuits 1140$_1$ and 1140$_2$ replaces old data with new in the line memory used by the other of the de-interlacing circuits, resulting in a "ping-pong" addressing scheme.

The de-interlacing mechanism 114 of FIG. 3 affords a saving in bandwidth because each frame is processed twice in exactly the same way since each of 2×120 Hz frames must be the same as 1×60 Hz frame. The newly calculated Present-to-Following motion is the same for both 120 Hz frames; there is no need write it each time it is calculated. To save bandwidth, the Motion Calculator in one of the de-interlacing circuits 1140$_1$ and 1140$_2$ could write the Following-to-Present motion value during the first frame with the Motion Calculator 1150 of the other of the de-interlacing circuits writing the motion during the second frame.

While the idea of performing two de-interlacing operations in parallel may seem inappropriate, empirical data has shown that this approach advantageously lowers memory and memory bandwidth requirements. Further, this approach allows for the use of a single clock for providing timing signals.

Figure 4:
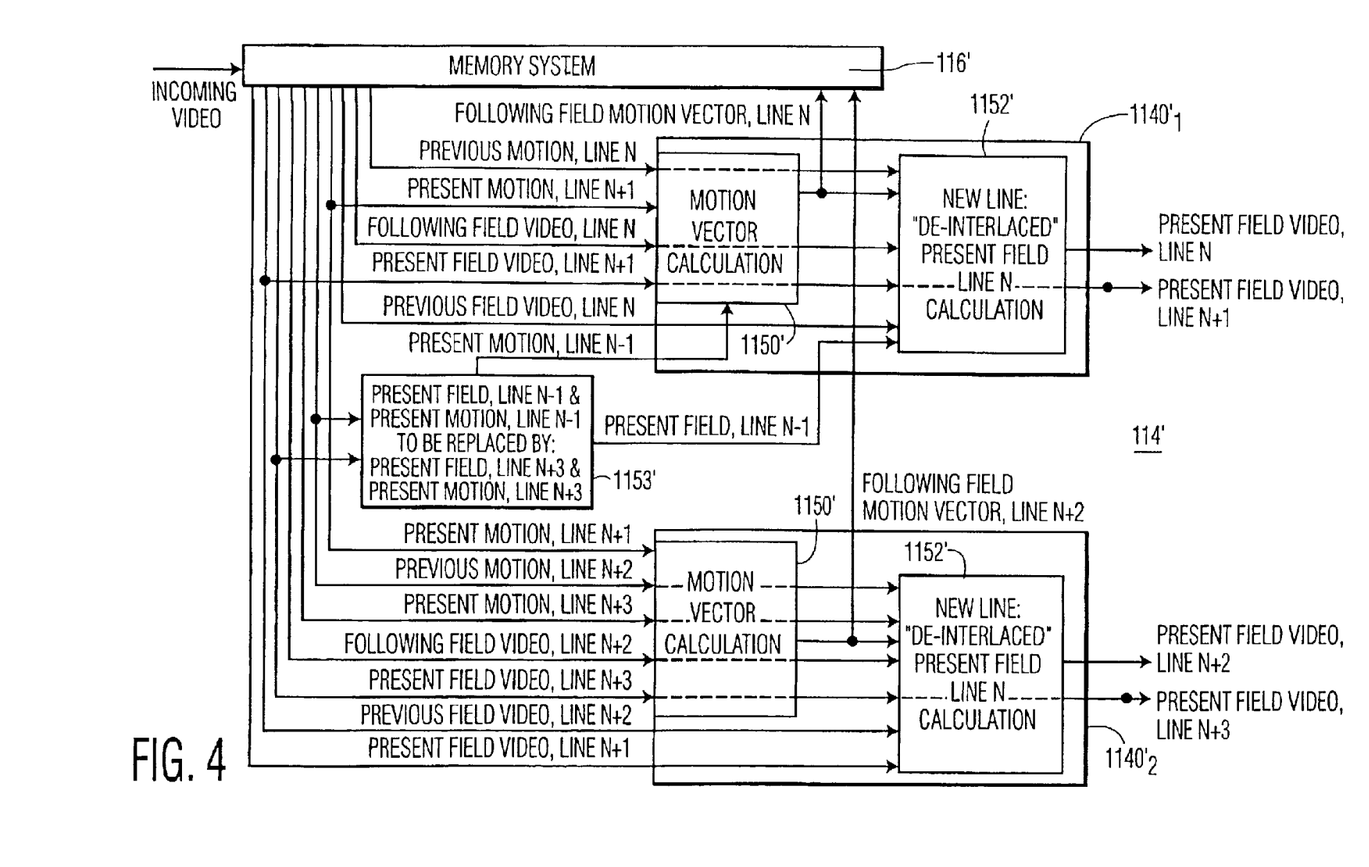
FIG. 4 depicts a second embodiment of a de-interlacer and frame doubler comprising part of the system of FIG. 2.

FIG. 4 depicts a second preferred embodiment of a de-interlacing mechanism 114' according to present principles which advantageously accomplishes both de-interlacing and frame doubling at a conventional clock speed by performing two de-interlacing operations in parallel. As seen in FIG. 4, the de-interlacing mechanism 114 includes a pair of de-interlacing circuits 1140'$_1$ and 1140'$_2$ that each read pixels (i.e., video data and motion) at the same time from sequential lines of video information stored in a memory system 116' described in greater detail in FIG. 5. The de-interlacing circuits 1140'$_1$ and 1140'$_2$ typically both have the same structure.

Within the de-interlacing circuit 1140'$_1$, a Motion Calculator 1150' receives from the memory system 116' both the Present-to-Previous motion associated with a particular line of video (N) and the Present-to-Previous motion for Line N+1, where N is an non-zero integer index value that successively increases by unity for each successive de-interlacing operation. In addition to receiving the Present-to-Previous motion s for Lines N and N+1, the Motion Calculator 1150' in the de-interlacing circuit 1140'$_1$ of FIG. 4 also receives the Following Field Video Line N, and the Present Field Video Line N+1 from the memory system 116', as well as Present-to-Previous motion for Line N−1 from a common line memory 1153'. As will be appreciated hereinafter, the line memory 1153' stores values for the Present Field Video Line N−1 and the Present-Previous motion Line N−1 which become refreshed with the values for the Present Field Video Line N+3 and the Present-to-Previous Motion Line N+3 upon the next subsequent de-interlacing operation. From the input data provided, the Motion Calculator 1150' calculates the Following-to-Present motion for Line N that is read into the memory system 116' for subsequent updating of the memory 1152'. The Following-to-Present motion for Line N becomes the Present-to-Previous motion for Line N upon the next successive access of the memory system 116' by the Motion Calculator 1150'.

The Following-to-Present Motion for Line N calculated by the Motion Calculator 1150', along with the Following Field Video Line N, the Present Field Video Line N+1, the Previous Field Video Line N read from the memory system 116', as well as a value for the Present Field Video Line N−1 stored in line memory 1153', all pass to a calculation block 1152' in the de-interlacing circuit 1140'$_1$. In accordance with such input data, the calculation block 1152' produces de-interlaced (progressive) values for Present Field video Lines N and N+1.

The de-interlacing circuit 1140'$_2$ has a similar structure as the de-interlacing circuit 1140'$_1$ and serves to perform a de-interlacing operation on the next two Lines N+1 and N+2 in parallel with the de-interlacing operation performed by the de-interlacing circuit 1140'$_1$ on the video Lines N and N+1. To that end, the de-interlacing circuit 1140'$_2$ includes a Motion Calculator 1150' that receives from the frame memory 116 the Present-to Previous Motion s for Lines N+1 and N+3, as well as the Previous motion for Line N+2. In addition, the Motion Calculator 1150' receives the Following Field video Line N+2, the Present Field Lines N+2 and N+3, and the Previous Field video Line N+2. From such data, the Motion Calculator 1150' in the de-interlacing circuit 1140'$_2$ calculates the Following-to-Present motion for Line N+2 for input into the memory system 116'. The Following-to-Present motion for Line N+2 becomes the Present-to Previous motion for video Line N+2 upon the subsequent reading of the memory system 116' to obtain the motion for that line.

Like the de-interlacing circuit 1140'$_1$, the de-interlacing circuit 1140'$_2$ includes a calculation block 1152' for generating the pair of sequential de-interlaced (progressive) field video Lines N+2 and N+3. In the case of the de-interlacing circuit 1140'$_2$, the calculation block 1150 reads the memory 116 to receive the Present-to Previous Motion for Line N+3, as well as the Previous motion for Line N+2. In addition, the Motion Calculator 1150' receives from the memory system 116' the Following Field video Line N+2, the Present Field video Lines N+2 and N+3, and the Previous Field video Line N+2. In accordance with such input values, the calculation block 1152 in the de-interlacing circuit 1140'$_2$ generates de-interlaced (progressive) Present Field Video Lines N+2 and N+3 in parallel with the Present Field Video Lines N and N+1 produced by the de-interlacing circuit 1140'$_1$.

Figure 5:
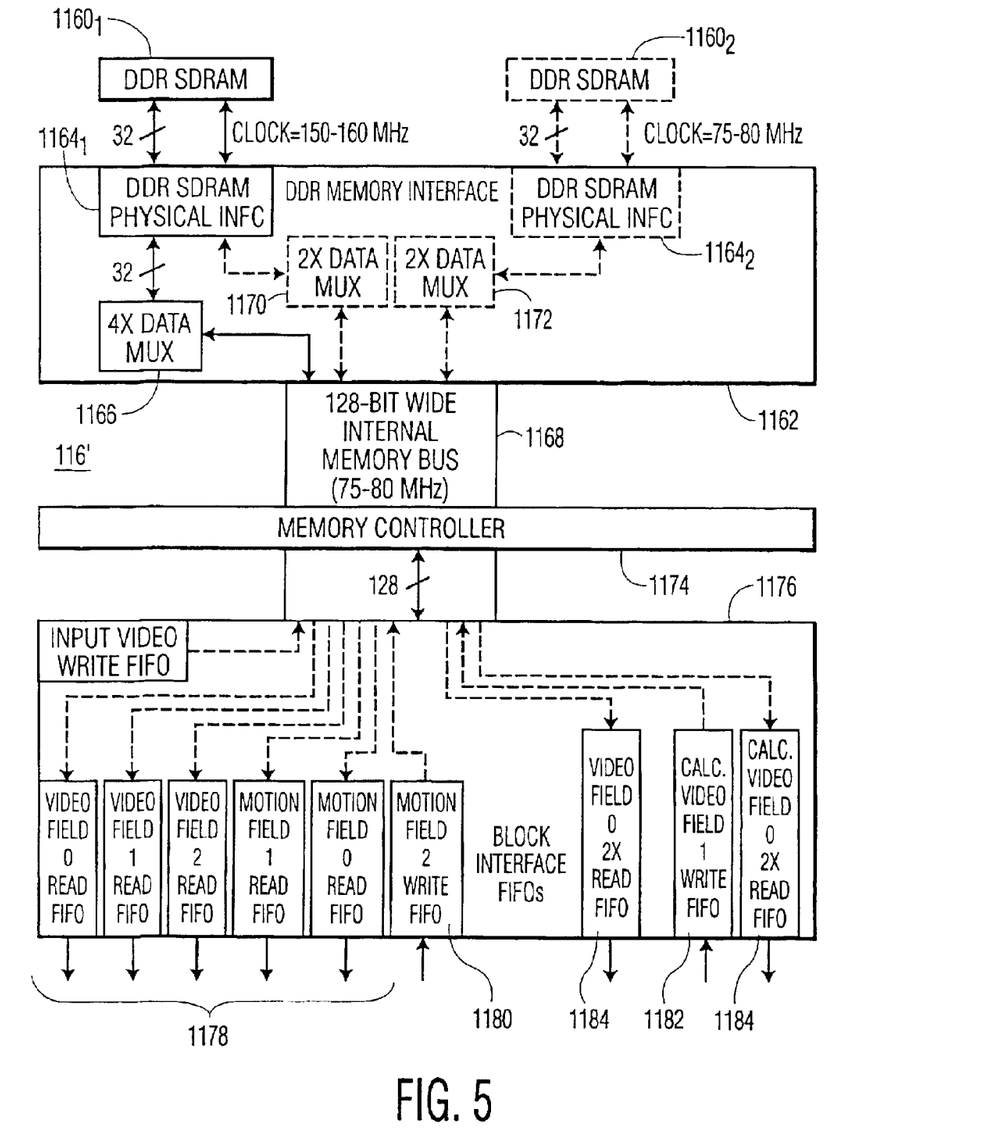
FIG. 5 depicts a block schematic diagram of a memory controller for the dual-rate de-interlacer and frame doubler of FIG. 4.

FIG. 5 depicts the details of the memory system 116' of the de-interlacing circuit 114' of FIG. 4. As seen in FIG. 5, the memory system includes at least one DDR SRAM 1160$_1$ having a 32-bit address bus and a clock frequency input for a 150–160 MHz clock signal. In addition, the memory system 116' can also include a second DDR SRAM 1160$_2$ (shown in phantom) having a 32-bit address bus and a clock frequency input for a 75–80 MHz clock signal. Each of the memories 1160$_1$ and 1160$_2$ interfaces with a DDR memory interface 1162. The memory interface 1162 includes a physical interface 1164$_1$ for the SDRAM 1160$_1$, and to the extent that the SDRAM 1160$_2$ is present, a physical interface 1160$_2$ for that memory. A data multiplexer 1166, having the capability of 4× data multiplexing, couples the physical interface 1164$_1$ to a 128-bit wide memory bus 1168 on the interface 1162. Alternatively, a multiplexer 1170 having the capability of 2× data multiplexing could couple the physical interface $1164_1$ to the memory bus 1168. When the memory $1160_2$ is present, a multiplexer 1172 having the capability of 2× data multiplexing will couple the physical interface $1164_1$ to the memory bus 1168.

The bus 1168 couples the memory interface 1162 to a memory controller 1174 that controls a FIFO (First In First Out) block 1176 containing a plurality first individual FIFO storage registers 1178 that each receive separate video field values for Lines 0, 1, 2 and so on, and motion field values for Lines 0, 1, 2 and so on for reading at a first clock rate by a separate one of the de-interlacing circuits $1140'_1$ and $1140'_2$ of FIG. 4. The FIFO block 1176 of FIG. 5 also includes at least one write FIFO 1180 into which a corresponding one of the de-interlacing circuit of FIG. 4 can write the Following-to Present motion for subsequent transmission one or more of the memories $1160_1$ and $1160_2$.

In addition to the write FIFO 1180, the FIFO block 1176 includes at least one, and preferably, a plurality of Video Field write FIFOs 1182 (only one of which is shown) into which each of the de-interlacing circuits $1140'_1$ and $1140'_2$ of FIG. 4 can write the calculated de-interlaced video lines for subsequent receipt by one of the DRAMS $1160_1$ and $1160_2$ of FIG. 5. Further, the FIFO 1176 block also includes at least one, and preferably, a plurality of double-speed read FIFOs 1184 (only one of which is shown) capable of being read at twice the regular clock rate. The FIFOs 1182 receive from one of the memories $1160_1$ and $1160_2$ the calculated de-interlaced video lines previously written into the write FIFOs 1182. Utilizing the double-speed read FIFOs 1184 to retain the calculated de interlaced field video line thus allows reading of the de-interlaced video lines twice during the normal clock interval to permit frame doubling.

Figure 6:
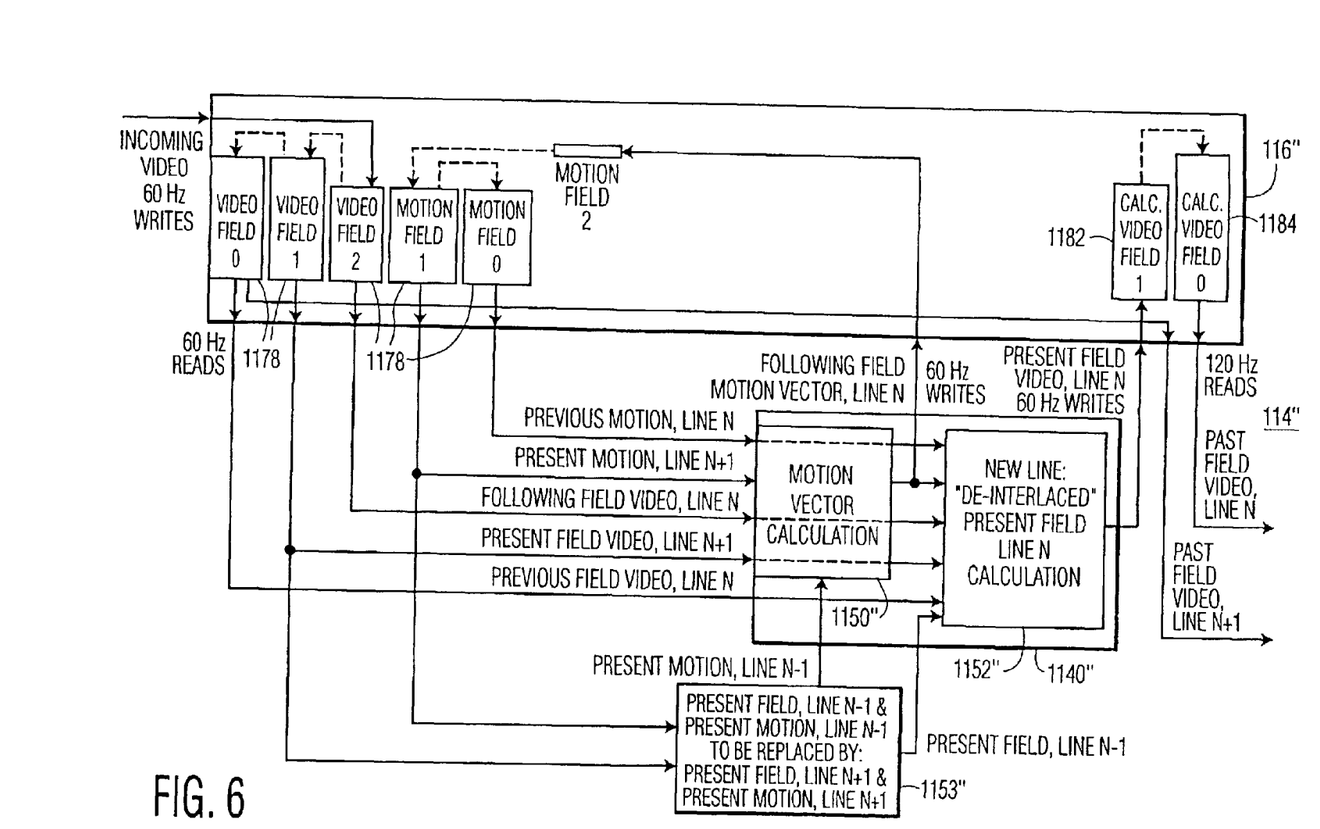
FIG. 6 depicts a third embodiment of a de-interlacer and frame doubler comprising part of the system of FIG. 2.

FIG. 6 depicts a third embodiment 114" of a de-interlacing mechanism that performs de-interlacing and frame doubling. In contrast to the de-interlacing mechanisms 114 and 114' of FIGS. 3 and 4, respectively, the de-interlacing mechanism 114" of FIG. 6 employs single de-interlacing circuit 1140" and associated memory system 116" having the same structure as the memory system 116' of FIG. 5. The de-interlacing circuit 1140" of FIG. 6 includes a Motion Calculator 1150" for calculating the Following-to-Previous motion for Line N upon receipt of: (1) the Previous Motion Line N, (2) the Present-to-Previous Motion for Line N+1, (3) the Present-to-Previous Motion for Line N−1, (4) the Following Field video Line N, and (5) Present Field Video Line N+1. The Motion Calculator 1150" reads the Present-to-Previous Motion for Line N−1 from a memory 1153" that stores this value previously read from a corresponding one of the read FIFOs 1178—1178 comprising part of a FIFO (not shown) block of the memory system 116". The Motion Calculator 1150" reads it's remaining input values from others of the FIFOs 1178—1178.

The memory 1153" not only stores a value for the Present-to-Previous motion for Line N−1 but also stores a value for the Field Video Line N. Upon each subsequent de-interlacing operation on the next successive Line N, memory 1153" will read the corresponding pair of FIFOs 1178—1178 to replace the values for the Present-to-Previous motion for Line N and the Present Field Video Line N with the value of the Present-to-Previous Motion Line N+1 and the Present Field Video Line N+1, respectively.

In addition to the Motion Calculator 1150", the de-interlacing circuit 1140" of FIG. 5 also includes a calculator block 1152". The calculator block 1152" receives the Following-to Present Motion for Line N produced by the Motion Calculator 1150". Further, the calculation block 1152" receives: (1) the Previous Motion for Line N, (2) the Following Field video Line N, (3) Present Field Video Line N+1 and (4) the Previous Field video Line N from the corresponding one of FIFOs 1178. Also, the calculation block 1152" receives the Present-to-Previous motion for Line N−1 from the memory 1153". From such input data, the calculation block 1152" generates a de-interlaced Present Field Video Line N for storage in FIFO 1182 before writing into a memory. The calculated de-interlaced Present Field Video Line N is then written into a read FIFO 1184 for read out twice the normal field rate, along with a calculated de-interlaced Past Field Video Line N+1 read from the corresponding FIFO 1178 at twice the field rate, thereby accomplishing frame doubling.

The foregoing describes a combined de-interlacing and frame doubling arrangement that performs full de-interlacing function in half of a frame field period to generate a progressive, frame doubled signal for receipt at a display device.

What is claimed is:

1. A combined de-interlacing and frame doubling system, comprising:
   a frame memory mechanism for storing frames of interlaced video data, the frames having a prescribed frame rate;
   first and second combined de-interlacing and frame-doubling circuit for each pulling each of two frames of video data from the frame memory mechanism at twice the frame rate and for performing a full de-interlacing function at half the frame rate time so as to perform two de-interlacing operations, once during each double rate frame, to generate a progressive, frame doubled signal for receipt at a display device, wherein the first and second combined de-interlacing and frame doubling circuits, each reads video data from the frame memory mechanism from two sequential lines at the same time, such that each circuit reads separate lines.

2. The apparatus according to claim 1 further including first and second line memories for receiving updated video data from the first and second combined de-interlacing and frame doubling circuits, respectively, and for writing such updated video to the second and first de-interlacing circuits, respectively.

3. The apparatus according to claim 1 wherein the combined de-interlacing and frame doubling circuit includes:
   a Motion Calculator for generating an updated motion for each successive Video line N (where N is an non-zero integer index value that successively increases by unity for each successive de-interlacing operation.) in accordance with video information stored in the frame memory mechanism; and
   a calculation block for calculating at least one de-interlaced Present Field Video Line in accordance with the updated motion from the Motion Calculator and stored video information in the frame memory mechanism.

4. The apparatus according to claim 3 wherein the calculation block calculates two successive de-interlaced Present Field Video Lines.

5. The apparatus according to claim 3 wherein the frame memory mechanism system comprises:
   a memory controller:
   a physical interface coupling the at least one DRAM to the memory controller; and
   a First-In First Out (FIFO) block containing a plurality of FIFO elements, each serving to hold data transferred between the at least one DRAM and the de-interlacing circuit.

6. A combined de-interlacing and frame doubling system, comprising:

a frame memory mechanism for storing frames of interlaced video data, the frames having a prescribed frame rate;

a first combined de-interlacing and frame doubling circuit for pulling video data from the frame memory mechanism associated with a first pair of successive video lines and for performing a full de-interlacing function at half the frame rate time so as to perform two de-interlacing operations, once during each double rate frame, to generate a first pair of successive de-interlaced Present Field Video Lines; and;

a second combined de-interlacing and frame doubling circuit for pulling video data from the frame memory mechanism associated with a second pair of successive video lines and for performing a full de-interlacing function in parallel with the de-interlacing operation performed by the first de-interlacing circuit at half the frame rate time so as to perform two de-interlacing operations, once during each double rate frame, to generate a second pair of successive de-interlaced Present Field Video Lines.

7. The apparatus according to claim 6 further including first and second line memories for receiving updated video data from the first and second de-interlacing circuits, respectively, and for writing such updated video to the second and first de-interlacing circuits, respectively.

8. The apparatus according to claim 6 wherein each combined de-interlacing and frame doubling circuit includes:

a Motion Calculator for generating an updated motion for each successive Video line N (where N is an non-zero integer index value that successively increases by unity for each successive de-interlacing operation) in accordance with video information stored in the frame memory mechanism; and a calculation block for calculating the de-interlaced pair of Present Field Video Lines in accordance with the updated motion from the Motion Calculator and stored video information in the frame memory mechanism.

9. The apparatus according to claim 6 wherein the frame memory mechanism includes at least one dynamic random access memory.

10. The apparatus according to claim 9 wherein the frame memory mechanism system further includes:

a memory controller;

a physical interface coupling the at least one DRAM to the memory controller; and a First-in First Out (FIFO) block containing a plurality of FIFO elements, each serving to hold data transferred between the at least one DRAM and the de-interlacing circuit.

* * * * *